United States Patent [19]

Holl

[11] Patent Number: 4,957,829
[45] Date of Patent: Sep. 18, 1990

[54] MODULAR BATTERY PLANT SYSTEM ASSEMBLY COMPRISING MULTIPLE UNIT CELL MODULES

[75] Inventor: Joel T. Holl, Parsippany, N.J.

[73] Assignee: AT&T Bell Laboratories, Murray Hill, N.J.

[21] Appl. No.: 371,368

[22] Filed: Jun. 26, 1989

[51] Int. Cl.$^5$ ............................................. H01M 2/10
[52] U.S. Cl. .................................... 429/99; 429/159; 429/186
[58] Field of Search ....................... 429/9, 97, 99, 158, 429/159, 186

[56] References Cited

U.S. PATENT DOCUMENTS

| | | | |
|---|---|---|---|
| 3,167,458 | 1/1965 | Brazell | 429/99 X |
| 3,338,452 | 8/1967 | Oakley et al. | 429/186 X |
| 3,664,877 | 5/1972 | Shaw | 429/159 X |
| 3,769,095 | 10/1973 | Schmidt | 429/158 X |
| 4,065,603 | 12/1977 | Colblon | 429/99 |
| 4,317,497 | 3/1982 | Alt et al. | 429/99 X |

OTHER PUBLICATIONS

"A Rack Mounted Complete DC Power System", by R. New and B. A. Wittey, *1982 IEEE Proceedings*, CH1818-4/82/0000-0270, pp. 270-276.

*Primary Examiner*—Stephen J. Kalafut
*Attorney, Agent, or Firm*—Alfred G. Steinmetz

[57] ABSTRACT

A battery plant system is comprised of an array of unit battery cells designed to interlock with each other. The interlocked unit cells are electrically connected to create battery cell assembly modules of the desired voltages. The interlocked unit battery cells are mounted on a multiple unit battery cell support member to form a battery cell assembly module. A stratum of battery cell assembly modules are installed on an assembly support tray. Pluralities of assembly support trays are stacked vertically and the battery cell assembly modules are interconnected into an interlocked spatial array to form the battery plant with ready accessibility provided to each battery cell assembly module for monitoring, maintenance and replacement.

11 Claims, 3 Drawing Sheets

MODULAR BATTERY PLANT SYSTEM ASSEMBLY COMPRISING MULTIPLE UNIT CELL MODULES

FIELD OF THE INVENTION

This invention relates to the physical design of a modular battery plant system based on unit battery cells as a basic building unit and in particular to an interlocking battery cell arrangement in which unit battery cells assemble together to form larger battery assembly modules which in turn are joined together to form a modular battery plant system.

BACKGROUND OF THE INVENTION

The construction of and design of battery plants is presently directed toward efficient use of space, economy of implementation and flexibility in operational practice with accompanying minimum maintenance requirements. In accord with these trends battery plants are conceived of in terms of modularized structures in which the structure can be readily added to as extra capacity is needed. Key objectives of these modular designs are compactness, low maintenance, interchangeability, flexibility and compatibility of individual components.

SUMMARY OF THE INVENTION

A battery plant system in accord with these objectives is comprised of an array of unit battery cells designed to interlock with each other into battery cell assembly modules. The interlocked unit cells are electrically connected to create the battery cell assembly modules of the desired voltages. The interlocked unit battery cells are mounted on a multiple unit battery cell assembly support base member to form the completed modular battery cell assembly. A stratum of a plurality of modular battery cell assemblies are installed on a multiple battery assembly support tray or structure. A plurality of these loaded assembly support trays are attached to a frame and stacked vertically into spatial arrays. The battery cell assemblies of the spatial array are electrically interconnected into an electrical grid array to form the completed battery plant with ready accessibility to an electrical terminal provided at the ends of each battery cell assembly module for monitoring, maintenance and replacement.

A busbar arrangement electrically interconnects terminals or posts of the individual unit battery cells on each supporting tray to form the battery cell assembly module. Each busbar provides an electrical connection at an exposed end of each battery cell assembly module with easy access provided for interbattery connections and maintenance activity by craftspersons. The exposed terminals permit multiple battery cell assembly modules to be electrically connected to form the battery plant array.

DETAILED DESCRIPTION

Figure 1:
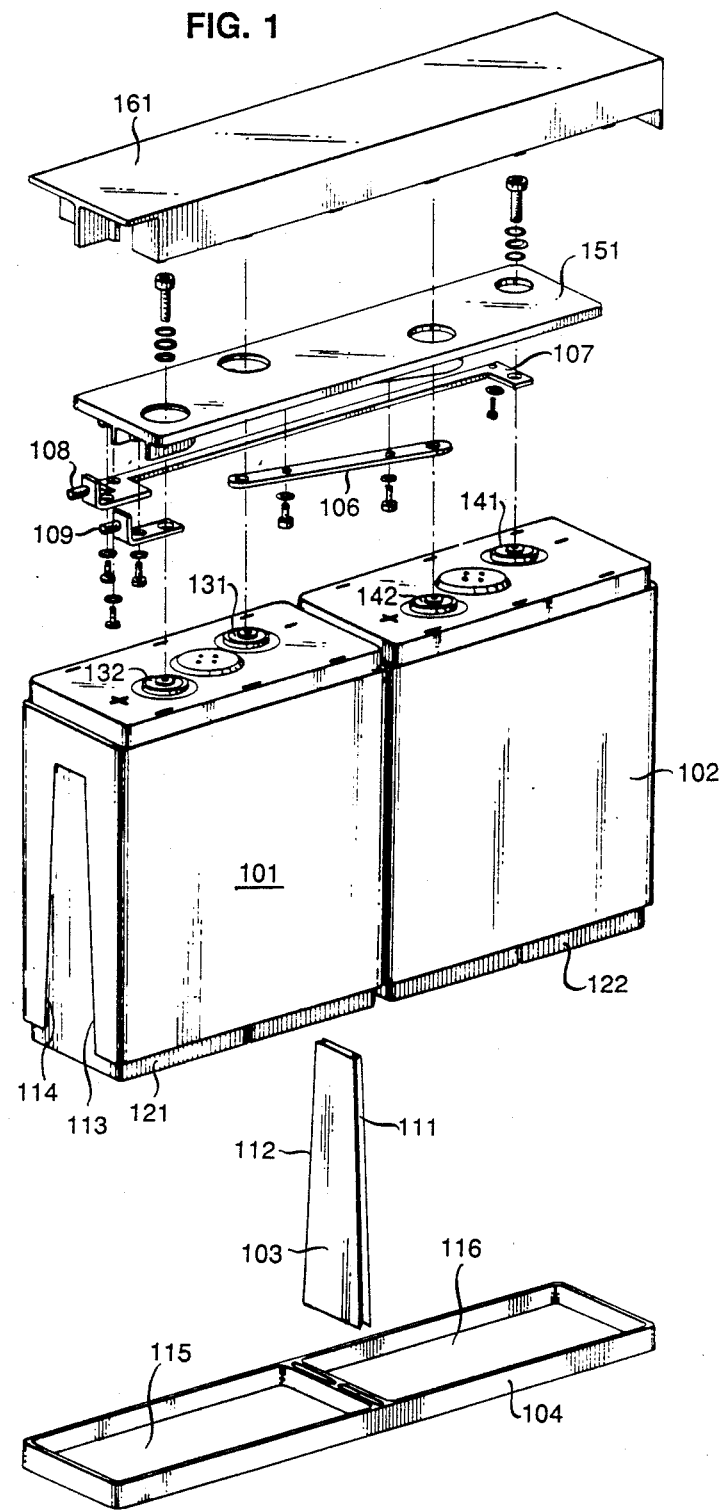
FIG. 1 is an exploded perspective view of a battery cell assembly including two unit cells connected in a series connection.

A two unit cell battery assembly is shown as an exploded perspective view in FIG. 1. It includes two unit battery cells 101 and 102 which are interlocked together by a linking device 103. Linking device 103 has opposing tapered V-grooved sides 111 and 112 which in turn engage two opposing dovetails 113 and 114, each of which have a tapered profile and are cut into the side of a unit battery cell. The two unit battery cells 101 and 102 are connected and secured together by the linking device 103 inserted between them. The two interlocked cells 101 and 102 are mounted on an assembly support 104. Each unit battery cell is undercut at the bottom to fit into a recess in the assembly base support 104 which has recessed receptacles 115 and 116 for accepting bottom portions 121 and 122 of unit battery cells 101 and 102.

Busses 106 and 107 are electrically connected to the battery terminals to electrically connect the unit battery cells in a series connection to form a battery cell assembly. The bus 106 is connected to the negative terminal 131 of unit battery cell 101 and to the positive terminal 142 of unit battery cell 102. Bus 107 is connected to the negative terminal 141 of unit battery cell 102 and to an end connector terminal 108 to facilitate a connection to other battery assembly modules. An end connector terminal 109 is connected to the positive terminal 132 of unit battery cell 101 to facilitate external connections. It is readily apparent that additional end connector terminals could be provided at the opposite end of the battery cell assembly.

The busses 106, 107 and 108 and the tops of unit battery cells 101 and 102 are covered by a top cover 151 which includes access holes 152 to leave the unit battery cell terminals exposed for ready electrical and mechanical access to the terminal. A second top cover 161 covers these access holes.

Figure 2:
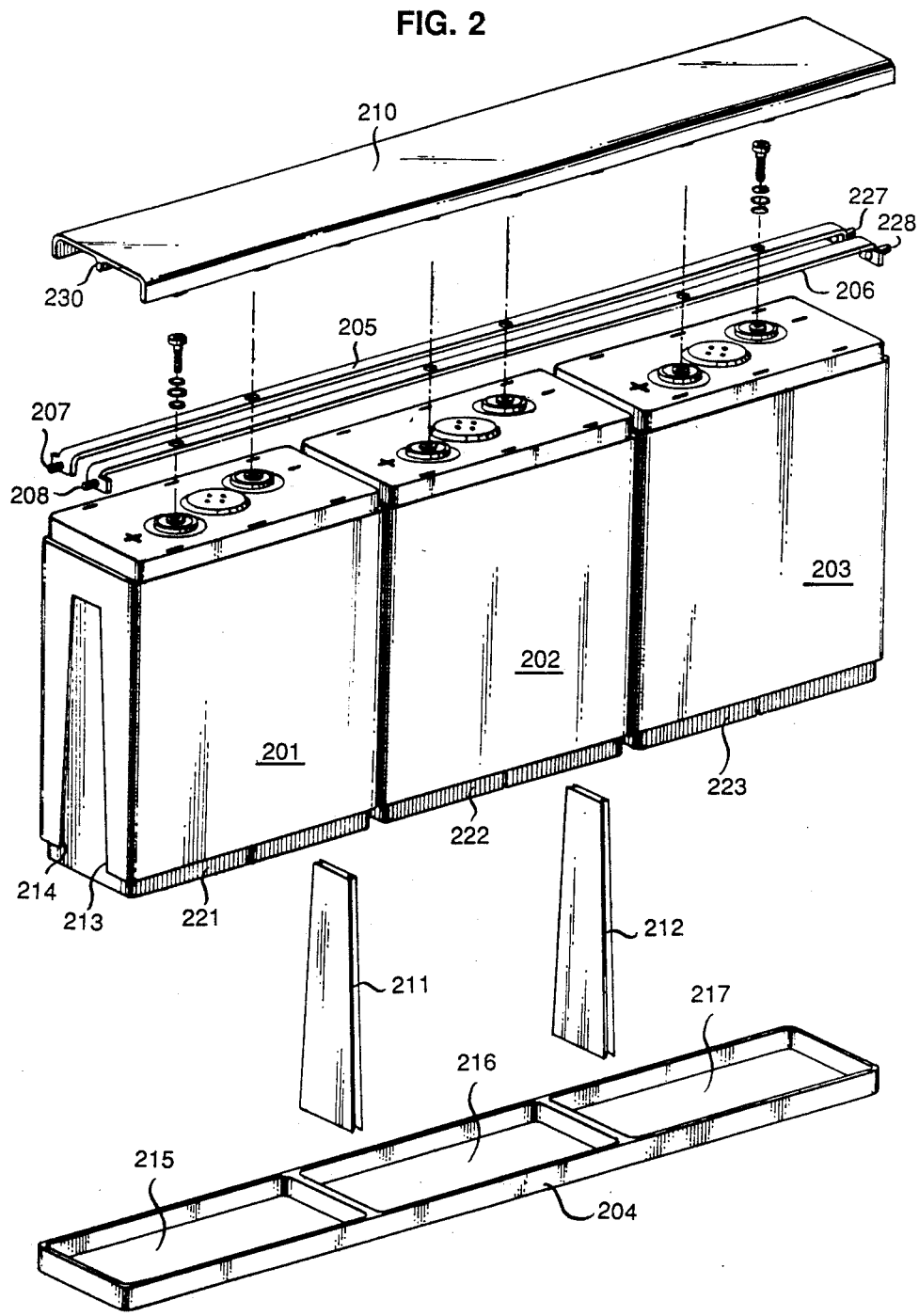
FIG. 2 is an exploded perspective view of a battery cell assembly including three unit cells connected in a parallel connection.

A three unit cell battery assembly module is shown as an exploded perspective view in FIG. 2. The three unit battery cells 201, 202 and 203 are connected into a parallel electrical connection by the two busses or busbars 205 and 206 which interconnect all the negative terminals and separately interconnect all the positive terminals, respectively. At one end of each bus 205 and 206 is an exposed output terminal 207 and 208 to facilitate electrical interconnections between battery cell assembly modules. Two exposed output terminals 227 and 228 are provided at the opposite end of the battery cell assembly. The unit battery cells are interlocked together with the locking devices 211 and 212 which engage dovetails 213 and 214 in the adjacent sides of the unit cells 201, 202 and 203. The bottoms 221, 222 and 223 of these three interlocked unit cells are placed into recessed receptacles 215, 216 and 217 in the base support 204. A cover 210 is placed on the top of this assembly. The cover 210 preferably includes an integral terminal insulation separator 230 to prevent inadvertent shorts of adjacent cell terminals.

Figure 3:
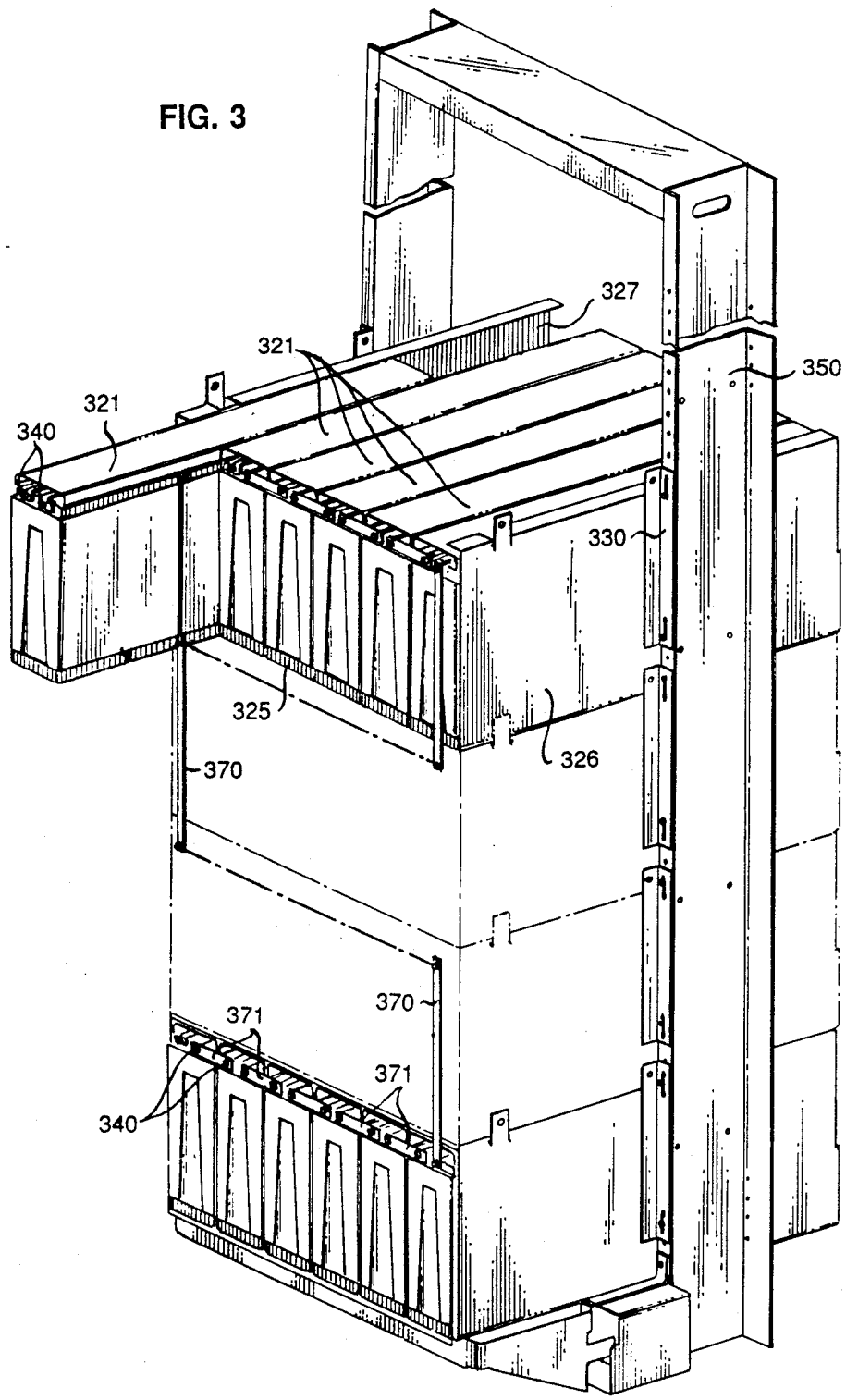
FIG. 3 is a perspective view of a plurality of multiple battery support structures, each including a plurality of battery cell assemblies, and stacked into a plant structure to form a battery plant.

A single stratum of battery cell assemblies 321 are arranged on an assembly support tray 325 as shown in a perspective view in FIG. 3. Since exposed access terminals 207, 208, 227 and 228 (shown in FIG. 2) are provided at opposite ends of the battery cell assembly module 321, the terminal polarity orientation exposed at the ends can be reversed by turning the battery cell assembly module around. Hence by alternating battery cell assembly module orientation alternate polarity terminals can be arranged to obtain various desired electrical connections. This assembly support tray 325 has a channel cross section with a bottom and two sidewalls 326 and 327 and mechanical connecting mechanisms 330 located on each side wall of the channel. As shown in FIG. 3 the battery cell assemblies slide into place on the tray 325 leaving the output terminals 340 of the busses at an exposed end at the battery cell assembly module 321 for ready access and for electrically interconnecting battery cell assembly modules.

The connecting mechanisms 330 enable the assembly support receptacles or trays to be attached to a vertical frame 350 as shown in FIG. 3. The individual support receptacles or trays 325 so secured are individually secured to the vertical frame 350 so as to be stacked vertically to form the complete battery plant assembly. With all buss output terminals 340 positioned in the front of each battery cell assembly module the battery cell assembly module interconnections and access points are optimally facilitated for ease of construction and maintenance. Individual terminals in each tray are interconnected to each other by short horizontal bus connections 371 and a vertical bus 370 connects an end terminal of one tray to an end terminal of another tray. In this illustrative example the battery cell assembly module's end terminal polarities are all alternately reversed in orientation in each of said stratums from one tray to the next to permit a continuous series connection with the vertical busses 370.

This battery plant construction permits a flexible modular arrangement which permits any size battery plant having particular electrical connections to be formed from simple basic modular units. Many varied arrangements of the battery plant will suggest themselves to those skilled in the art without departing from the spirit and scope of the invention.

I claim:

1. A battery plant system, comprising:
   a plurality of unit battery cells, each unit cell including; positive and negative terminals and having keyed accepting detents in opposing sides of each unit cell, an interlocking mechanism engaging keyed accepting detents of adjacent unit battery cells for serially joining the unit battery cells into a battery cell assembly module,
   a base support for supporting the unit battery cells interlocked into a battery cell assembly module, at least first and second assembly busses for electrically joining electrical terminals of the unit battery cells and including output terminals included in the busses located at an exposed end of the battery cell assembly module to form the positive and negative output terminals of the battery cell assembly module,
   a supporting receptacle for holding a single stratum of a plurality of battery cell assembly modules,
   a frame work for accepting mounting of the supporting receptacles in vertical tiers and a plurality of plant busses connected for electrically joining the output terminals included in the assembly busses to form a battery plant.

2. A battery plant system as claimed in claim 1, wherein:
   each unit battery cell having at least one side including opposing dovetails tapered towards each other, and
   a linking device having opposing tapered V-grooved sides for engaging adjacent ones of the opposing dovetails of two adjacent unit battery cells and interlock adjacent unit battery cells together.

3. A battery plant system as claimed in claim 2, wherein:
   the output terminals are all located at a front end of the battery cell assembly module.

4. A battery plant system as claimed in claim 2, wherein:
   the output terminals are located at both ends of the battery cell assembly module.

5. A battery plant system as claimed in claim 2, wherein:
   a bottom of each unit battery cell is undercut to fit into a recess in the base support.

6. A battery plant system as claimed in claim 5, wherein:
   the supporting receptacles have a channel cross section and each include two side walls having a connecting mechanism for securing the supporting receptacle to the frame work.

7. A battery plant system, comprising:
   a plurality of unit battery cells interlocked with each other into a battery cell assembly module,
   the unit battery cells in each module electrically connected to accessible terminals at an outer perimeter of each battery cell assembly module,
   a plurality of battery cell assembly modules being mounted as a stratum on battery cell assembly support trays,
   a plurality of support trays being stacked in a tier and attached to a vertical support frame, and
   the accessible terminals being interconnected to form a battery plant.

8. A battery plant system as defined in claim 7 wherein the each plurality of unit battery cells is interconnected electrically by means of busses interconnecting terminals of the unit battery cells.

9. A battery plant system as defined in claim 8 wherein the each of the unit battery cells are mounted on a base support in which a bottom of each unit cell is undercut to fit into a recess in the base support.

10. A battery plant system as defined in claim 9 wherein each of the plurality of unit battery cells has tapered dovetails in at least one sidewall and
    a linking device for simultaneously engaging the dovetails of adjacent sides of two unit battery cells.

11. A battery plant system as defined in claim 10 wherein the support trays have a connecting mechanism for securing them to the vertical support frame.

* * * * *